UNITED STATES PATENT OFFICE.

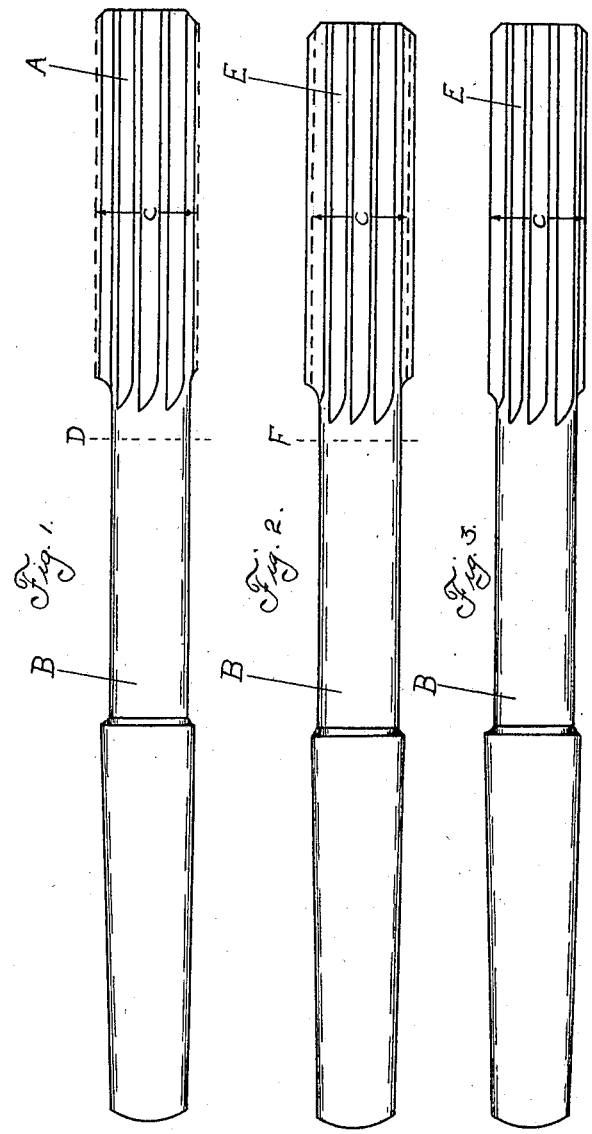

STUART A. COGSDILL, OF DETROIT, MICHIGAN, ASSIGNOR TO GRINDING PROCESS TOOL COMPANY, OF DETROIT, MICHIGAN, A CORPORATION OF MICHIGAN.

METHOD OF SALVAGING CUTTING TOOLS.

1,403,011.      Specification of Letters Patent.     Patented Jan. 10, 1922.

Application filed March 11, 1920. Serial No. 364,992.

*To all whom it may concern:*

Be it known that I, STUART A. COGSDILL, a citizen of the United States of America, residing at Detroit, in the county of Wayne and State of Michigan, have invented certain new and useful Improvements in Methods of Salvaging Cutting Tools, of which the following is a specification, reference being had therein to the accompanying drawings.

This invention relates to a method of salvaging cutting tools and more particularly reamers.

It is the object of the invention to provide a method for restoring cutting tools, and especially reamers, to their original diameter when the same have been worn to an undersize.

Briefly stated, this method consists in cutting-off the under-size cutting head of a worn tool, welding upon the shank of the tool an over-size head cut from a like worn tool of a larger size and machining the over-size head to reestablish the original diameter of the first mentioned cutting head, and to also eliminate any slight inaccuracy of alignment between head and shank, such as may occur in forming the weld.

In the drawings:

Figure 1 is a view of a reamer, the cutting head of which is reduced to undersize by wear, the original size of the head being indicated in dash lines;

Figure 2 is a view of said tool after removal of the original head and welding upon the shank thereof an over-size head, the desired original diameter being again indicated in dash lines;

Figure 3 is a view of the completed tool.

In these views A and B designate, respectively, the cutting head and fashioned shank of a reamer, said head being worn to an undersize diameter, and C is the dimension of the original full size head. D is a line indicating the point of the shank close adjacent the head where a cut is taken in performing the first step of the method to sever the worn head from the shank. E indicates an oversize cutting head which is butt-welded, preferably electrically, to the shank B after removal of the head A from said shank, the location of the weld being indicated by the line F. The head E is taken from a worn tool similar to the tool A, B, but of a slightly larger size, and may be severed from its shank in the same manner and at the same point as the head A is severed from shank B. After being integrated with the shank B, the oversize head E is ground down to the desired diameter C, as is shown in Figure 3, and any inaccuracy of alignment between the head and shank which may have arisen in forming the weld is eliminated during the grinding operation. Thus, there is obtained a tool having the desired size cutting head fully as good as a new tool of such size. The cutting head A, which has been discarded in producing this tool, may, if desired, be butt-welded to a shank, from which a somewhat smaller worn head has been removed and may be then ground down to the original size of the removed head.

From the foregoing description it is evident that the described method accomplishes a valuable saving in reclaiming worn tools which, in the prior practice, it has been necessary to discard. While said method is particularly applicable to reamers, it may also be applied to various other tools which, when slightly reduced in diameter through wear, become unfit for their original purpose.

What I claim as my invention is:

The method of salvaging worn cutting tools consisting in severing the cutting heads from two worn tools slightly differing in diameter, in securing the larger of said heads to the shank of the smaller worn tool, in reducing the head thus secured to a smaller diameter and at the same time correcting, by such reduction, any inaccuracy of alignment between the shank and tool.

In testimony whereof I affix my signature.

STUART A. COGSDILL.